UNITED STATES PATENT OFFICE.

IVAN SEMENOFF, OF ST. PETERSBURG, RUSSIA.

SOLUTION OF GOLD AND MERCURY AND PROCESS OF MAKING SAME.

SPECIFICATION forming part of Letters Patent No. 528,611, dated November 6, 1894.

Application filed December 14, 1893. Serial No. 493,650. (No specimens.)

*To all whom it may concern:*

Be it known that I, IVAN SEMENOFF, a subject of the Emperor of Russia, residing at St. Petersburg, Russia, have invented a certain new and useful Medical Preparation; and I do hereby declare that the following is a full, clear, and exact description of the invention, which will enable others skilled in the art to which it appertains to make and use the same.

My invention has for its object a medicinal preparation more especially designed for external use in nervous diseases, such as neuralgia, nervous head-aches, paralytic affections, &c., but has also proven efficacious in gastric diseases, particularly gastric catarrh, nausea, and diarrhea, by internal as well as external application.

In carrying out my invention I proceed as follows: I form a solution of gold, preferably rolled gold in sal ammoniac and commercial nitric acid at about 1.5° Baumé in the following proportions: two (2) drams of gold, six (6) drams of sal ammoniac, and six (6) drams of commercial nitric acid, in a suitable vessel, as a porcelain cup, the mixture being either allowed to stand until the solution is completed, or said solution may be accelerated by stirring the mixture from time to time until the gold is dissolved. I next prepare a solution of metallic mercury in nitric acid in the proportion of six (6) drams of mercury and ten (10) drams of nitric acid. The gold solution is then attenuated by addition thereto of ten (10) ounces of boiled or distilled water of a temperature of about 120° Fahrenheit, and allowed to cool to about 80° Fahrenheit. To this attenuated gold solution I next add the solution of mercury, the mixture being agitated or stirred or repeatedly transfused from one vessel into another, whereby the mercury is partly volatilized, while the major portion of the gold is precipitated in the form of a dark powder. The liquid is then separated from this precipitate and the latter washed with a sufficiency of boiling water to free it from all acid, the wash water being added to the aforesaid liquid, about six (6) pounds of water being preferably used for this purpose with a view to further attenuate the gold and mercurial solution, so that the final liquid will contain about one-fourth ($\frac{1}{4}$) of a dram of gold in solution in about six (6) pounds of water. The gold precipitate obtained as above set forth is then used in the preparation of gold solutions instead of rolled gold.

Of course it will hardly be necessary to state that in the preparation of the gold and mercurial solutions as well as of the final liquor, proper precautions should be taken against the inhalation of the fumes or vapors arising from the liquids.

The final liquid which constitutes the medicinal preparation or compound should be well agitated before using the same, owing to the tendency of the gold to precipitate in part, and this should also be done before filling the liquid into bottles for use.

In nervous affections, as partial paralysis, nervous head-ache, and similar nervous affections, the part or parts affected (except, however, the arm pits) should be rubbed with the liquid once or twice daily until eruption of the skin or a rash is produced.

In case of gastric diseases, as gastric catarrh, nausea, or diarrhea, the liquid is not only applied externally, as described, but also internally in doses of from three to six drops daily in about an ounce of hot water. The described medicinal agent has also proven of value in other diseases.

I have herein-above given the proportions of constituents used which I have found to give good results, but I do not desire to confine myself thereto, as they may be varied without departure from the nature or spirit of my invention.

Having thus described my invention, what I claim as new therein, and desire to secure by Letters Patent, is—

1. The herein-described medicinal compound consisting of a solution of chlorid of gold and a nitrate of mercury, for the purpose set forth.

2. The mode of preparing the herein-described medicinal compound, which consists in forming a solution of gold in sal ammoniac and nitric acid, and a solution of mercury in nitric acid, attenuating the gold solution by addition thereto of warm water, mixing therewith the solution of mercury, separating from said solution such gold as is precipitated, and
5 attenuating the solution with water until it contains about one dram of gold in six pounds of water, substantially as set forth.

In testimony whereof I have signed my name to this specification in the presence of two subscribing witnesses.

IVAN SEMENOFF.

Witnesses:
N. TSCHEKALOFF,
J. FLIERLING.